Sept. 16, 1969  R. N. KNIGHTS  3,467,228
AUTOMATIC ADJUSTING DEVICE FOR USE IN BRAKES
Filed Aug. 4, 1967  3 Sheets-Sheet 3

3,467,228
AUTOMATIC ADJUSTING DEVICE FOR
USE IN BRAKES
Richard Northam Knights, Gloucester, England, assignor to The Dunlop Company Limited, Fort Dunlop, Erdington, Birmingham, England, a corporation of Great Britain
Filed Aug. 4, 1967, Ser. No. 658,571
Claims priority, application Great Britain, Aug. 13, 1966, 36,329/66
Int. Cl. F16d 65/46, 55/06
U.S. Cl. 188—196                    9 Claims

ABSTRACT OF THE DISCLOSURE

Disk brake including an automatic adjustment device to effect rotation of an adjustment member relative to a tie rod with which the adjustment member is in screw-threaded engagement upon release of the brake after more than a predetermined amount of friction pad wear has occurred, a coiled clutch spring associated with the adjustment member and with a nonrotatable member being provided to prevent rotation of the adjustment member relative to the tie rod upon application of the brake.

---

This invention relates to disc brakes and is an improvement in or modification of the invention described in our co-pending U.K. patent application No. 38,730/64.

One object of the invention is to provide an improved automatic adjustment device for a disc brake of the kind described in our co-pending U.K. patent application No. 38,730/64.

A disc brake of this kind comprises an annular disc drivably secured at its outer periphery to a rotatable spider, a pair of friction elements arranged in axially aligned positions one on each side of the disc, each friction element being axially slidably supported on a pair of pins located in spaced-apart positions adjacent the inner periphery of the disc, the pins being mounted on a nonrotatable support and aligned parallel to the axis of the disc, a tie rod having one end associated with a first friction element on one side of the disc and extending axially adjacent the inner periphery of the disc, and a brake operating mechanism for drawing the friction elements towards one another to apply the brake, the brake-operating mechanism being associated with the tie rod and with a second friction element on the opposite side of the disc and comprising a ball-and-ramp expander mechanism.

According to the present invention, in a disc brake of the kind described the ball-and-ramp expander mechanism comprises a first thrust member associated with a tie rod and a second thrust member nonrotatably associated with the second friction element, the thrust members having a plurality of pairs of ramped recesses therebetween and balls located in said pairs of ramped recesses, the first thrust member being rotatable relative to the second thrust member in one direction to apply the brake and in the other direction to release the brake, and there is provided an adjustment mechanism comprising a reaction member keyed against rotation relative to the second thrust member to support the first thrust member against the axial brake-applying thrust developed by the expander mechanism, an adjustment member mounted in screw-threaded engagement with the tie rod to support the reaction member against the said thrust, a first coiled clutch spring associated with the adjustment member and the first thrust member and arranged so as to be rotatable without turning the adjustment member on application of the brake and to be capable of rotating the adjustment member on release of the brake, and a second coiled clutch spring associated with the adjustment member and the reaction member and arranged to prevent rotation of the adjustment member during application of the brake.

In a preferred construction according to the invention the adjustment member has a hollow cylindrical portion surrounding the reaction member and extending axially towards the disc to a position closely adjacent the first thrust member, a seal being provided between the cylindrical portion and the first thrust member to exclude dirt and moisture from the adjustment mechanism. The first clutch spring is wrapped around the outer surface of the cylindrical portion and has a radially outwardly turned end which is engageable with a formation associated with the first thrust member.

Two embodiments of the invention will now be described with reference to the accompanying drawings in which.

Figure 1:
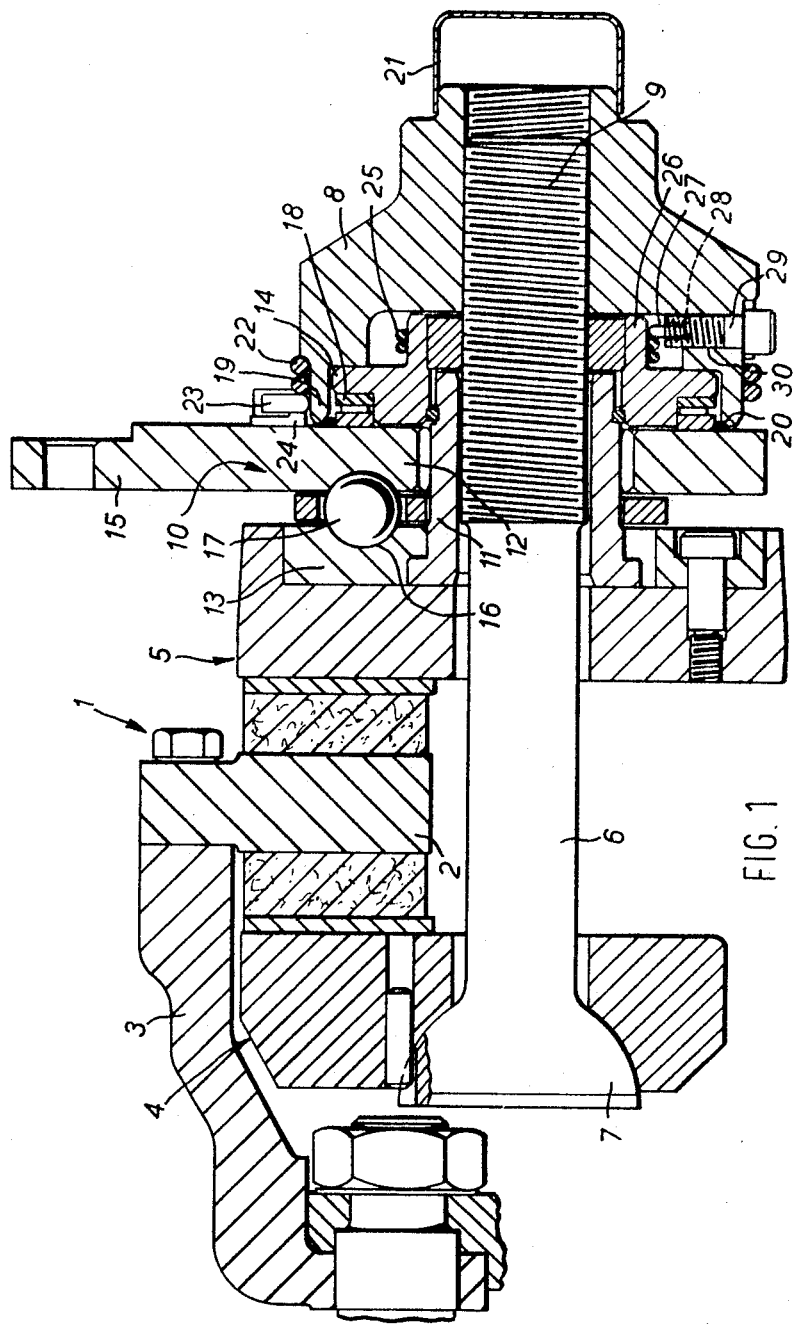
FIGURE 1 is an axial cross-sectional view of one embodiment of a disc brake according to the invention.

As shown in FIGURE 1 of the drawings a disc brake 1 of the general kind described in our co-pending U.K. patent application No. 38,730/64 comprises an annular disc 2 drivably secured at its outer periphery to a rotatable spider 3. A first friction element 4 and a second friction element 5 are arranged in axially aligned positions one on each side of the disc. The friction elements are axially slidably supported on a pair of axially extending pins (not shown) located in spaced apart positions adjacent the inner periphery of the disc 2, and a tie rod 6 is provided for drawing the friction elements towards one another to apply the brake. The tie rod has a head 7 at one end arranged to be nonrotatably secured to the first friction element 4 to draw it towards the disc, and passes through both friction elements, having an adjustment member 8 axially adjustably supported on a screw-threaded portion 9 at its other end.

A ball-and-ramp expander mechanism 10 is mounted between the adjustment member 8 and the second friction element 5, and comprises a cylindrical bush 11 through which the tie rod 6 is axially slidable, and a first thrust member 12 rotatably mounted on the bush and associated with a second thrust member 13 which is non-rotatably secured to the second friction element 5 and to the bush. A reaction member 14 abutting the adjustment member 8 to transmit thereto a reaction thrust from the first thrust member 12 is axially slidably mounted on the bush 11 and non-rotatably keyed thereto. The first thrust member 12 has an operating lever 15 integral therewith for connection to an operating cable or other brake operating means.

The first thrust member 12 and the second thrust member 13 are formed with three pairs of confronting ramped recesses 16 in which balls 17 are located, so that rotation of the first thrust member around the tie rod 6 will cause the balls to ride up the ramps of their recesses and thus tend to move the thrust members axially apart. A thrust bearing 18 is interposed between the first thrust member 12 and the reaction member 14 to transmit thrust from the first thrust member to the reaction member.

In operation the second thrust member 13 urges the second friction element 5 towards the disc 2 and the reaction member 14 abuts the adjustment member so that the reaction thrust generated by the expander mechanism 10 is transmitted through the adjustment member and the tie rod 6 to the first friction element 4 to draw the first friction element towards the disc.

The adjustment member 8 has a hollow cylindrical portion 19 which surrounds the reaction member 14 and extends axially towards the disc 2 to a position closely adjacent the first thrust member 12. An O-ring 20 is provided to seal the gap between the cylindrical portion and the first operating member, the seal being located on the outer periphery of the thrust bearing 18. An end cap 21 is provided on the other end of the adjustment member to enclose the outer end of the tie-rod 6.

A first coiled clutch spring 22 is wrapped around the radially outer surface of the cylindrical portion 19 of the adjustment member 8 and has one end 23 turned radially outwardly to engage in a formation constituted by a slot formed in an abutment member 24 detachably secured to the first thrust member 12. The slot is of greater width, considered in the circumferential direction, than the diameter of the spring wire, and provides sufficient "backlash" to enable the operating lever 15 and its associated first thrust member 12 to be turned through the maximum angle required to fully apply the brake, when less than a predetermined amount of friction pad wear has occurred, without rotating the radially outwardly turned end of the first clutch spring.

If more than a predetermined amount of friction element wear occurs the end 23 of the spring 22 is contacted by one end of the slot formed in abutment member 24. The spring will therefore be moved circumferentially on application of the brake, and on release of the brake the other end of the slot will engage the end of the spring to restore the spring to its original position. The spring is wound so that it can slip on the adjustment member 8 when its end 23 is moved in the direction of the brake-applying movement of the first thrust member, but on the brake-releasing movement the spring will tighten on the adjustment member and will rotate it. The screw-threaded engagement between the adjustment member and the tie rod 6 is such that rotation of the adjustment member effected in this manner on release of the brake will cause the adjustment member to move towards the disc to take up excess clearance resulting from friction element wear.

In the event of a large amount of wear occurring during light braking in which no adjustment has been effected, it might be possible for a situation to arise in which on the release movement of the operating member the spring 22 would tend to turn the adjustment member before the axial load on the tie rod 6 had been released. Since the adjustment member 8 would not turn under this condition, the first thrust member would not turn and the brake would be "locked on." To avoid the possibility of such a situation arising the spring 22 is arranged to slip in the brake-releasing direction at a predetermined torque load which is greater than that required to turn the adjustment member 8 in the condition when the axial load on the tie rod is released, but which is less than the brake-releasing torque which can be exerted by the brake return spring.

In order to prevent rotation of the adjustment member 8 during application of the brake a second coiled clutch spring 25 is wrapped around an axially-extending cylindrical projection 26 formed on the reaction member 14, and coupling means is provided for coupling one end of the second spring to the adjustment member.

The coupling means comprises a locating member in the form of a hollow screw 29 detachably secured in a screw-threaded radial hole 30 in the adjustment member, the bore 28 of the screw being engageable with the radially outwardly turned end 27 of the second coiled clutch spring. The second clutch spring is wound in a direction so that it grips the reaction member whenever the adjustment member tends to turn with the first thrust member in the brake-applying direction, while permitting the adjustment member to turn in the direction of the release movement of the first thrust member.

When the friction elements 4, 5 are fully worn and new friction elements are to be fitted, the abutment member 24 and the hollow screw 29 are both removed to permit the adjustment member 8 to be unscrewed manually.

The adjustment mechanism of the disc brake described above is simple and compact in construction, is easily adjusted manually for replacement of the friction elements, and has the additional advantage that the screwthread is enclosed to prevent the entry of foreign matter.

Figure 2:
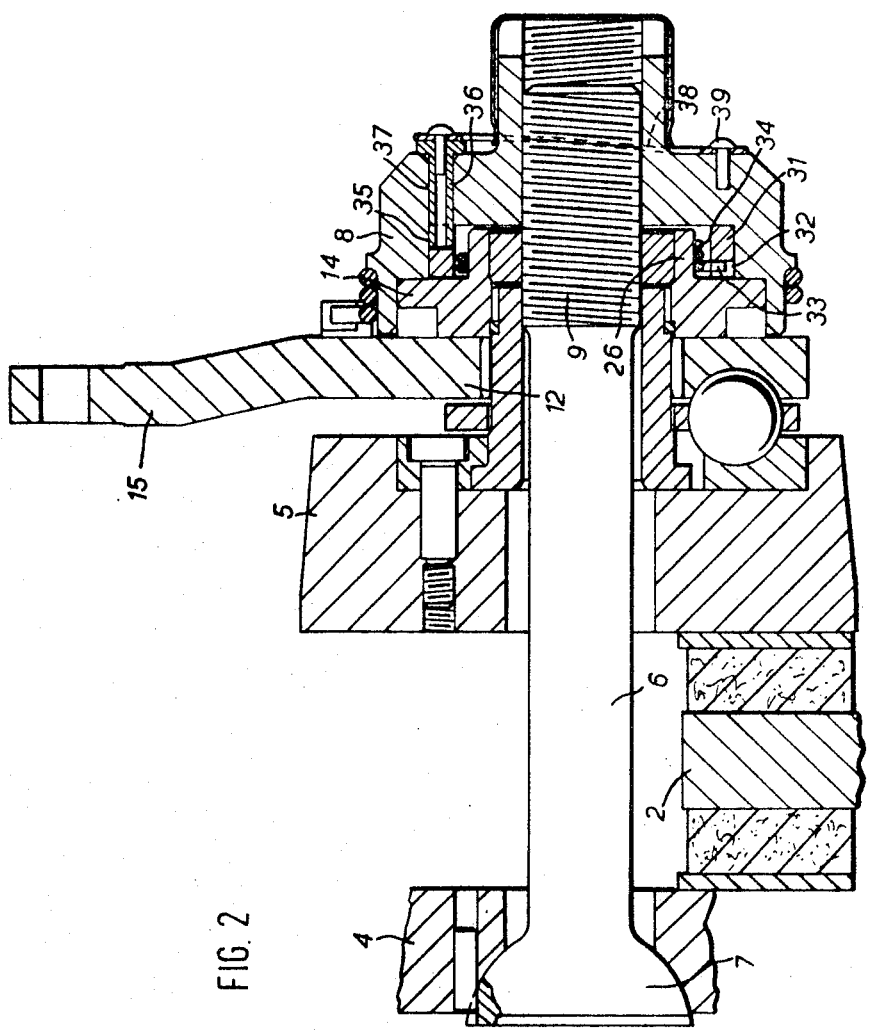
FIGURE 2 is an axial cross-sectional view of another embodiment of a disc brake according to the invention.
Figure 3:
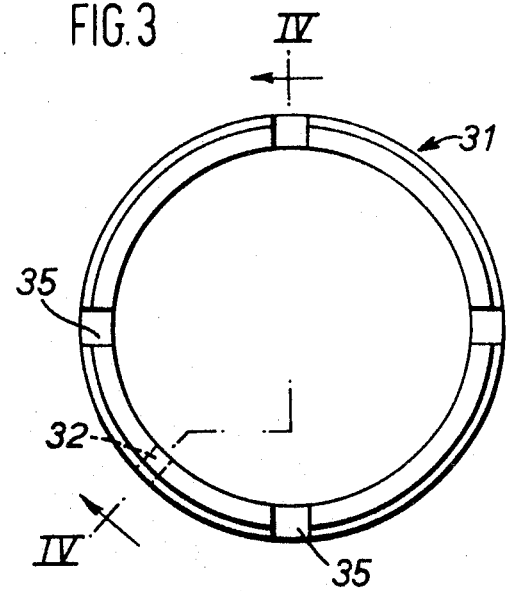
FIGURE 3 is an enlarged axial cross-sectional view of one component of the disc brake shown in FIGURE 2.
Figure 4:
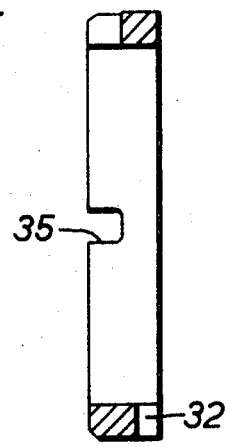
FIGURE 4 is a sectional view taken on the line IV—IV in FIGURE 3.

The embodiment of the invention shown in FIGURES 2, 3 and 4, is similar to the embodiment shown in FIGURE 1, and corresponding parts of the brake are numbered as in FIGURE 1, but an alternative arrangement is provided for coupling the adjustment member 8 to the second coiled clutch spring to prevent rotation of the adjustment member during brake application.

In place of the hollow screw 29 of the embodiment shown in FIGURE 1 there is provided a detachable locating member in the form of a locating ring 31 mounted within the adjustment member 8. The ring 31 has one radial slot 32 formed on its first side to engage the radially outturned end 33 of a second coiled clutch spring 34, and four radial slots 35 formed on its second side in equally spaced positions round the periphery thereof and engageable with retaining means in the form of a locating peg 36 associated with the adjustment member 8.

The locating peg 36 is located in an axially-extending bore 37 formed in the adjustment member and is detachably retained therein by a clip in the form of a leaf spring 38 secured to the adjustment member by rivets 39.

The second clutch spring 34 is wound in a direction so that it grips the projection 26 formed on the reaction member 14 whenever the adjustment member 8 tends to turn with the first thrust member 12 in the brake-applying direction, while permitting the adjustment member to turn in the direction of the brake-releasing movement of the first thrust member.

The embodiment described above has the advantage over the embodiment of FIGURE 1 that on re-assembly after replacing worn friction eelments 4, 5, the locating peg 36, which has to be removed to enable the adjustment member 8 to be screwed axially outwardly along the tie rod 6 to enable new friction elements to be inserted, can be more easily engaged in one of the four radial slots 35 formed in the second side of the locating ring 31 than the hollow screw 29 of the previous embodiment can be located on the out-turned end of the spring 25.

Although the present invention has been illustrated and described in connection with selected example embodiments, it will be understood that these are illustrative of the invention and are by no means restrictive thereof. It is reasonably to be expected that those skilled in this art can make numerous revisions and adaptations of the invention and it is intended that such adaptations and revisions will be included within the scope of the following claims as equivalents of the invention.

Having now described my invention, what I claim is:

1. A disc brake having a ball-and-ramp expander mechanism, a first thrust member, a tie rod operatively connected to said first thrust member, a first friction element operatively connected to said tie rod, a second thrust member, a second friction element, operatively connected to said second thrust member, said thrust members having a plurality of pairs of ramped recesses therebetween and balls located in said pairs of ramped recesses, said first thrust member being rotatable relative to the second thrust member in one direction to apply the brake and in the other direction to release the brake, an adjustment mechanism comprising a reaction member keyed against rotation relative to the second thrust member to support said first thrust member against the axial brake applying thrust developed by said expander mechanism, an adjustment member having screw-threaded engagement with said tie rod to support the reaction member against the said thrust, a first coiled spring associated with the adjustment member and the first thrust member and arranged so as to be rotatable without turning the adjustment member on application of the brake and to effect rotation of the adjustment member on release of the brake, and a second coiled spring associated with the adjustment member and the reaction member and arranged to prevent rotation of the adjustment member during application of the brake.

2. A disc brake according to claim 1 wherein the adjustment member has a hollow cylindrical portion surrounding the reaction member and extending axially towards the disc to a position closely adjacent the first thrust member, a seal being provided between the cylindrical portion and the first thrust member to exclude dirt and moisture from the adjustment mechanism.

3. A disc brake according to claim 2 wherein the first clutch spring is wrapped round the outer surface of the cylindrical portion of the adjustment member and has a radially outwardly turned end which is engageable with a formation associated with the first thrust member.

4. A disc brake according to claim 3 wherein the formation is constituted by an abutment member secured to the first thrust member and having formed therein an opening in which the radially outwardly turned end of the first clutch spring is locatable, the dimensions of the opening being sufficient to permit the first thrust member to be rotated through the angle required to apply the brake fully when less than a predetermined amount of friction pad wear has occurred, without rotating the said end of the first clutch spring.

5. A disc brake according to claim 1 wherein the second coiled clutch spring is wrapped around an axially-extending cylindrical projection formed on the reaction member, coupling means being provided for coupling one end of the second spring to the adjustment member.

6. A disc brake according to claim 5 wherein the coupling means comprises a detachable locating member secured to the adjustment member, and engageable with a radially outwardly turned end of the second coiled clutch spring.

7. A disc brake according to claim 6 wherein the locating member is in the form of a hollow screw.

8. A disc brake according to claim 6 wherein the locating member is in the form of a locating ring mounted in the adjustment member, the ring having at least one slot formed therein for engagement with one end of the second coiled clutch spring and at least one slot for engagement with retaining means associated with the adjustment member for preventing rotation of the locating ring relative to the adjustment member.

9. A disc brake according to claim 8 wherein the retaining means comprises a detachable locating peg for location in a bore formed in the adjustment member.

References Cited

UNITED STATES PATENTS 3,211,263   10/1965   Harrison.

DUANE A. REGER, Primary Examiner

U.S. Cl. X.R.

188—73